(12) United States Patent
Holtzapple et al.

(10) Patent No.: US 6,530,211 B2
(45) Date of Patent: Mar. 11, 2003

(54) QUASI-ISOTHERMAL BRAYTON CYCLE ENGINE

(76) Inventors: Mark T. Holtzapple, 1805 Southwood Dr., College Station, TX (US) 77840; G. Andrew Rabroker, 2811 Jennifer, College Station, TX (US) 77846

( * ) Notice: Subject to any disclaimer, the term of this patent is extended or adjusted under 35 U.S.C. 154(b) by 0 days.

(21) Appl. No.: 09/930,246

(22) Filed: Aug. 16, 2001

(65) Prior Publication Data

US 2002/0014069 A1 Feb. 7, 2002

Related U.S. Application Data

(62) Division of application No. 09/363,818, filed on Jul. 30, 1999, now Pat. No. 6,336,317.
(60) Provisional application No. 60/094,920, filed on Jul. 31, 1998.

(51) Int. Cl.[7] ................................................ F02C 5/00
(52) U.S. Cl. ...................... 60/39.6; 418/166; 418/171; 418/61.3
(58) Field of Search ........................... 60/39.6; 418/166, 418/171, 61.3

(56) References Cited

U.S. PATENT DOCUMENTS

| 457,294 | A | 8/1891 | Tilden et al. |
|---|---|---|---|
| 2,011,338 | A | 8/1935 | Hill |
| 2,138,490 | A | 11/1938 | Haller |
| 2,240,056 | A | 4/1941 | Schmitz |
| 2,291,354 | A | 7/1942 | Sibley |
| 2,373,368 | A | 4/1945 | Witchger |
| 2,459,447 | A | 1/1949 | Milliken |
| 2,601,397 | A | 6/1952 | Hill et al. |
| 2,938,663 | A | 5/1960 | Luck |
| 2,965,039 | A | 12/1960 | Morita |
| 2,974,482 | A | 3/1961 | Kelley |
| 3,167,913 | A | 2/1965 | Muhlberg et al. |
| 3,273,341 | A | 9/1966 | Wildhaber |
| 3,303,783 | A | * 2/1967 | Neubauer .................... 418/166 |
| 3,303,784 | A | * 2/1967 | Neubauer .................... 418/166 |
| 3,536,426 | A | * 10/1970 | Albretch et al. ............ 418/166 |

(List continued on next page.)

FOREIGN PATENT DOCUMENTS

| AU | 20406 | 5/1929 | ................. 418/166 |
|---|---|---|---|
| DE | 40 23 299 A1 | * 2/1991 | |
| GB | 2 085 969 A | * 5/1982 | ................. 418/171 |
| JP | 5001674 | 1/1993 | ................. 418/171 |
| JP | 579464 | 3/1993 | ................. 418/171 |

Primary Examiner—Thomas Denion
Assistant Examiner—Thai-Ba Trieu
(74) Attorney, Agent, or Firm—Baker Botts L.L.P.

(57) ABSTRACT

An engine is disclosed. According to one embodiment of the present invention, the engine comprises a compressor, and combustor, and an expander. The compressor compresses ambient air. The combustor burns the compressed air, and produces exhaust gasses. The expander receives the exhaust gases from the combustor, and expands the exhaust gasses. The compressor may be a gerotor compressor or a piston compressor having variable-dead-volume control. The expander may be a gerotor expander or a piston expander having variable-dead-volume control. In another embodiment, an engine comprises a piston compressor, a combustor, a piston expander, and a pressure tank. The piston compressor compresses ambient air. The combustor bums the compressed air, and produces exhaust gasses. The piston expander receives the exhaust gasses from the combustor, and expands the exhaust gasses. The pressure tank receives and stores the compressed air from the compressor. In another embodiment, a gerotor compressor or a gerotor expander comprises an inner gerotor, and an outer gerotor. The inner gerotor and the outer gerotor are driven so that they do not touch. The gerotors may be cantilevered or non-cantilevered.

8 Claims, 18 Drawing Sheets

U.S. PATENT DOCUMENTS

| | | |
|---|---|---|
| 3,844,117 A | 10/1974 | Ryan |
| 3,877,218 A | 4/1975 | Nebgen |
| 3,932,987 A | 1/1976 | Munzinger |
| 3,995,431 A | 12/1976 | Schwartzman |
| 4,023,366 A | 5/1977 | Schneider |
| 4,058,938 A | 11/1977 | Harle et al. |
| 4,199,305 A | 4/1980 | Pareja ................. 418/171 |
| 4,336,686 A | 6/1982 | Porter |
| 4,439,119 A | 3/1984 | Petersen et al. |
| 4,478,553 A | 10/1984 | Leibowitz et al. |
| 4,502,284 A | 3/1985 | Chrisoghilos |
| 4,519,206 A | 5/1985 | van Michaels |
| 4,553,513 A | 11/1985 | Miles et al. |
| 4,578,955 A | 4/1986 | Medina |
| 4,657,009 A | 4/1987 | Zen |
| 4,674,960 A | 6/1987 | Rando et al. |
| 4,696,158 A | 9/1987 | DeFrancisco |
| 4,759,178 A | 7/1988 | Joy |
| 4,836,760 A | 6/1989 | MacLeod |
| 4,951,790 A * | 8/1990 | Blything ................ 418/61.3 |
| 4,958,997 A | 9/1990 | Harwath ................ 418/171 |
| 4,976,595 A | 12/1990 | Taniguchi ............... 418/171 |
| 4,986,739 A | 1/1991 | Child |
| 5,074,110 A | 12/1991 | Singh |
| 5,101,782 A | 4/1992 | Yang |
| 5,195,882 A * | 3/1993 | Freeman ................ 418/171 |
| 5,271,215 A | 12/1993 | Guillet |
| 5,311,739 A | 5/1994 | Clark ................... 60/39.06 |
| 5,472,329 A | 12/1995 | Maynard et al. |
| 5,522,356 A | 6/1996 | Palmer |
| 5,538,073 A | 7/1996 | Stopa |
| 5,557,921 A | 9/1996 | Frutschi et al. |
| 5,622,044 A | 4/1997 | Bronicki et al. |
| 5,634,339 A | 6/1997 | Lewis et al. |
| 5,682,738 A | 11/1997 | Barber |
| 5,755,196 A | 5/1998 | Klassen |
| 5,761,898 A | 6/1998 | Barnes et al. |
| 5,839,270 A | 11/1998 | Jirnov et al. |
| 6,174,151 B1 * | 1/2001 | Yarr .................... 418/171 |

* cited by examiner

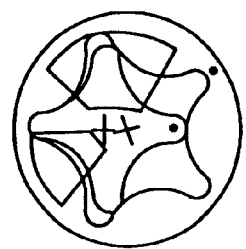
FIG. 3g
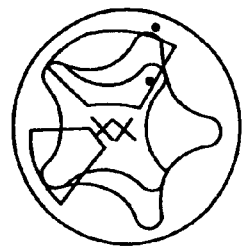
FIG. 3f
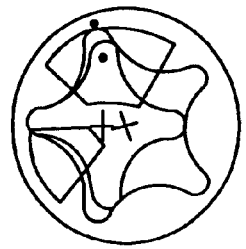
FIG. 3e
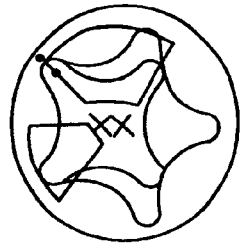
FIG. 3d
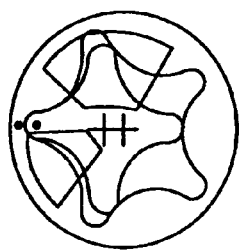
FIG. 3c
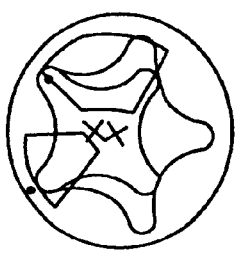
FIG. 3l
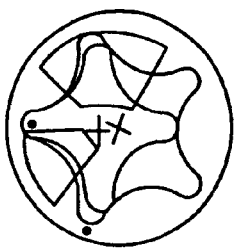
FIG. 3k
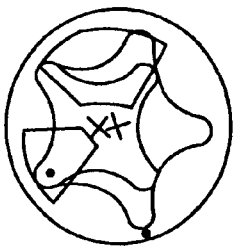
FIG. 3j
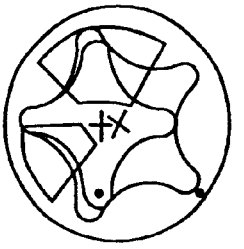
FIG. 3i
FIG. 3h Compressor Expander

[ ]=3000 rpm
( )=10,000 rpm

QUASI-ISOTHERMAL BRAYTON CYCLE ENGINE

The present application is a divisional application of U.S. patent application Ser. No. 09/363,818, filed Jul. 30, 1999, now U.S. Pat. No. 6,336,317, issued Jan. 8, 2002, entitled "Quasi-Isothermal Brayton Cycle Engine," and claims priority from U.S. Provisional Application No. 60/094,920, filed Jul. 31, 1998, entitled "Brayton Cycle Engine," the disclosures of which are incorporated herein by reference in their entirety.

BACKGROUND OF THE INVENTION

1. Field of the Invention

The invention relates generally to the field of power systems, and, more particularly, to a Quasi-Isothermal Brayton Cycle power system.

2. Description of the Related Art

For mobile applications, such as an automobile or truck, generally it is desirable to use a heat engine that has the following characteristics:

Internal combustion to reduce the need for heat exchangers;
Complete expansion for improved efficiency;
Isothermal compression and expansion;
High power density;
High-temperature expansion for high efficiency;
Ability to efficiently "throttle" the engine for part-load conditions;
High turn-down ratio (i.e., the ability to operate at widely ranging speeds and torques;
Low pollution;
Uses standard components with which the automotive industry is familiar;
Multifuel capability; and
Regenerative braking.

There are currently several types of heat engines, each with its own characteristics and cycles. These heat engines include the Otto Cycle engine, the Diesel Cycle engine, the Rankine Cycle engine, the Stirling Cycle engine, the Erickson Cycle engine, the Carnot Cycle engine, and the Brayton Cycle engine. A brief description of each engine is provided below.

The Otto Cycle engine is an inexpensive, internal combustion, low-compression engine with a fairly low efficiency. This engine is widely used to power automobiles.

The Diesel Cycle engine is a moderately expensive, internal combustion, high-compression engine with a high efficiency that is widely used to power trucks and trains.

The Rankine Cycle engine is an external combustion engine that is generally used in electric power plants. Water is the most common working fluid.

The Erickson Cycle engine uses isothermal compression and expansion with constant-pressure heat transfer. It may be implemented as either an external or internal combustion cycle. In practice, a perfect Erickson cycle is difficult to achieve because isothermal expansion and compression are not readily attained in large, industrial equipment.

The Carnot Cycle engine uses isothermal compression and adiabatic compression and expansion. The Carnot Cycle may be implemented as either an external or internal combustion cycle. It features low power density, mechanical complexity, and difficult-to-achieve constant-temperature compressor and expander.

The Stirling Cycle engine uses isothermal compression and expansion with constant-volume heat transfer. It is almost always implemented as an external combustion cycle. It has a higher power density than the Carnot cycle, but it is difficult to perform the heat exchange, and it is difficult to achieve constant-temperature compression and expansion.

The Stirling, Erickson, and Carnot cycles are as efficient as nature allows because heat is delivered at a uniformly high temperature, $T_{hot}$, during the isothermal expansion, and rejected at a uniformly low temperature, $T_{cold}$, during the isothermal compression. The maximum efficiency, $\eta_{max}$, of these three cycles is:

$$\eta_{max} = 1 - \frac{T_{cold}}{T_{hot}}$$

This efficiency is attainable only if the engine is "reversible," meaning that the engine is frictionless, and that there are no temperature or pressure gradients. In practice, real engines have "irreversibilities," or losses, associated with friction and temperature/pressure gradients.

The Brayton Cycle engine is an internal combustion engine that is generally implemented with turbines, and is generally used to power planes and some electric power plants. The Brayton cycle features very high power density, normally does not use a heat exchanger, and has a lower efficiency than the other cycles. When a regenerator is added to the Brayton cycle, however, the cycle efficiency is increased. Traditionally, the Brayton cycle is implemented using axial-flow, multi-stage compressors and expanders. These devices are generally suitable for aviation in which aircraft operate at fairly constant speeds; they are generally not suitable for most transportation applications, such as automobiles, buses, trucks, and trains, that must operate over widely varying speeds.

The Otto cycle, the Diesel cycle, the Brayton cycle, and the Rankine cycle all have efficiencies less than the maximum because they do not use isothermal compression and expansion steps. Further, the Otto and Diesel cycle engines lose efficiency because they do not completely expand high-pressure gasses, and simply throttle the waste gasses to the atmosphere.

SUMMARY OF THE INVENTION

Therefore, a need has arisen for a device that meets the above-mentioned and other characteristics for both mobile and stationary engines.

A need has also arisen for a device that overcomes these and other deficiencies.

An engine is disclosed. According to one embodiment of the present invention, the engine comprises a compressor, and combustor, and an expander. The compressor compresses ambient air. The combustor burns the compressed air, and produces exhaust gasses. The expander receives the exhaust gases from the combustor, and expands the exhaust gasses. The compressor may be a gerotor compressor or a piston compressor having variable-dead-volume control. The expander may be a gerotor expander or a piston expander having variable-dead-volume control.

In another embodiment, an engine comprises a piston compressor, a combustor, a piston expander, and a pressure tank. The piston compressor compresses ambient air. The combustor burns the compressed air, and produces exhaust gasses. The piston expander receives the exhaust gasses from the combustor, and expands the exhaust gasses. The pressure tank receives and stores the compressed air from the compressor.

In another embodiment, a gerotor compressor comprises an inner gerotor, and an outer gerotor. The inner gerotor and the outer gerotor are driven so that they do not touch. The gerotors may be cantilevered or non-cantilevered.

In another embodiment, a gerotor expander comprises an inner gerotor, and an outer gerotor. The inner gerotor and the outer gerotor are driven so that they do not touch. The gerotors may be cantilevered or non-cantilevered.

The engine of the present invention has many potential mobile power applications, including use in locomotives, the marine industry, tractor/trailers, busses, and automobiles. The engine of the present invention also has many potential stationary power applications, including, inter alia, electricity generator, and motive power for industrial equipment.

A technical advantage of the present invention is that the compressor and expander have rotary motion, which avoids the cost, complexity, weight, and size associated with transforming the linear motion of conventional pistons/cylinders into rotary motion.

Another technical advantage of the present invention is that the compressor and expander have a high "turn-down ratio" meaning they can operate efficiently at both high and low speeds.

Yet another technical advantage of the present invention is that the compressor and the expander are positive displacement devices that allows them to operate at low speeds in low-power applications.

Another technical advantage of the present invention is that the gerotor compressor and expander are perfectly balanced which virtually eliminates vibrations.

Another technical advantage of the present invention is that the engine is very responsive and accelerates quickly, much like a Wankel engine, because of its small size and light weight.

Another technical advantage of the present invention is that the gerotor compressor is robust, allowing liquid water to be sprayed for cooling during compression.

Another technical advantage of the present invention is that, in mobile applications, the expander can be independently decoupled from the drive train, allowing regenerative braking by operating the compressor from the kinetic energy in the vehicle.

Yet another technical advantage of the present invention is that, in mobile applications, the compressor can be independently decoupled from the drive train, allowing the expander to put all of its power into accelerating the vehicle giving the vehicle a power boost during startup.

Another technical advantage of the present invention is that there is little pollution emitted because of the high efficiency of the tubular combustor.

Another technical advantage of the present invention is that the tubular combustor can burn almost any fuel.

Another technical advantage of the present invention is that an electric starter motor is not needed because stored compressed air can be used to start the engine.

Another technical advantage of the present invention is that the engine is quiet because gases exit the expander at about 1 atm. No muffler should be needed.

Another technical advantage of the present invention is that engine lubricant, such as oil, should last a long time because there is no blow-by of incompletely combusted products.

Another technical advantage of the present invention is that there are very few moving parts, which should allow the engine to be very reliable with a long life.

Another technical advantage of the present invention is that the engine is extremely efficient; it approximates the Ericsson cycle, a reversible engine that is Carnot efficient.

Other technical advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which:

FIGS. 3a–l illustrate the operation of a gerotor compressor according to one embodiment of the present invention;

DETAILED DESCRIPTION OF PREFERRED EMBODIMENTS

Figure 1:
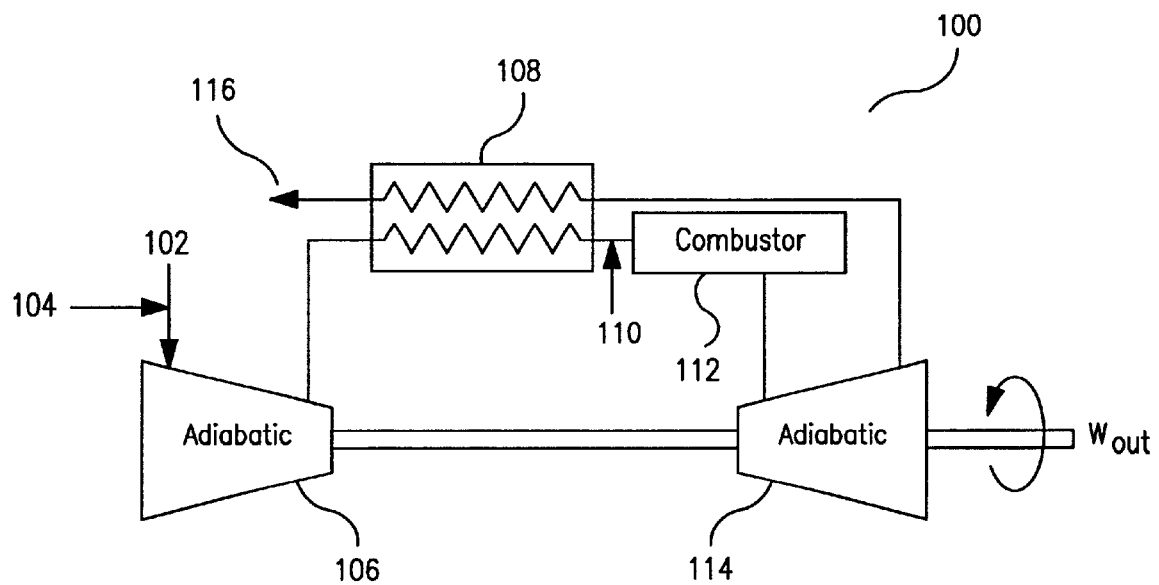
FIG. 1 depicts a block diagram of a quasi-isothermal Brayton cycle engine according to one embodiment of the present invention.

Embodiments of the present invention and their technical advantages may be better understood by referring to FIGS. 1 though 14, like numerals referring to like and corresponding parts of the various drawings.

Referring to FIG. 1, a general block diagram of quasi-isothermal Brayton cycle engine 100 according to one embodiment of the present invention is disclosed. Ambient air 102 is received and compressed in compressor 106, and then countercurrently heated in regenerator 108 using the thermal energy from exhaust gasses. In combustor 112, fuel 110 is introduced into the prewarmed air and ignited. The high pressure combustion gasses flow into expander 114, where work, $W_{out}$, is produced.

After air expands in expander 114, the hot air flows through regenerator 108, preheating the air flowing from compressor 106 to combustor 112. The air exits regenerator 108 as exhaust gas 116.

To minimize work requirements for compressor 106, atomized liquid water 104 may be sprayed into ambient air 102, cooling ambient air 102 during compression in compressor 106. The outlet temperature from compressor 106 is nearly the same as the inlet temperature; thus, the compression is considered to be "quasi-isothermal."

Figure 2:
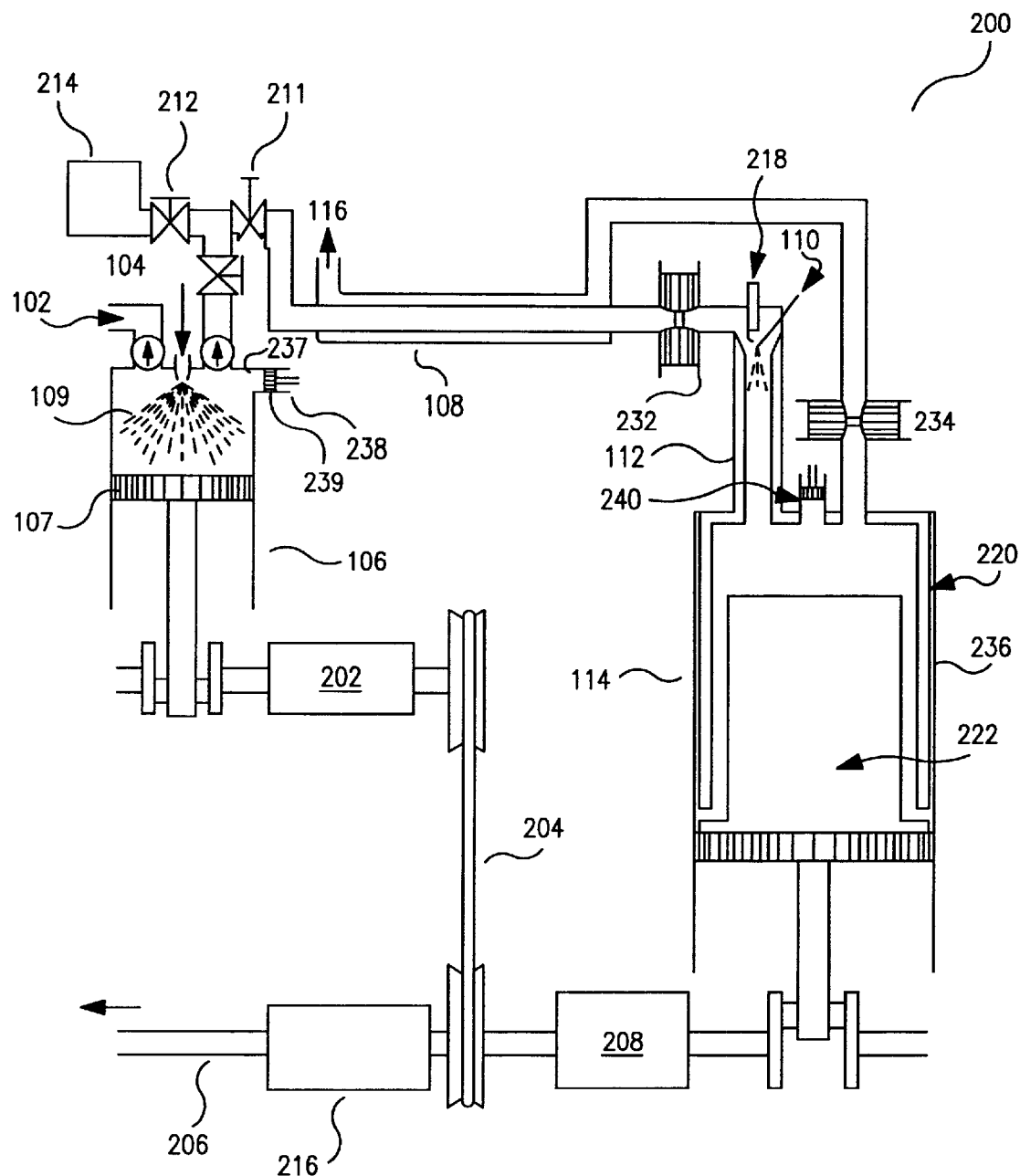
FIG. 2 depicts a schematic of a quasi-isothermal Brayton cycle engine implemented in a transportation system according to one embodiment of the present invention.

FIG. 2 depicts a schematic of a quasi-isothermal Brayton cycle engine implemented in a transportation system. The operation of engine 200 will be described during steady-state, braking and startup.

During steady-state operation, water mist 104 is sprayed into ambient air 102 of compressor 106. This results in the outlet air temperature being almost the same as the inlet air temperature, making the compression "quasi-isothermal."

To achieve the benefits of the quasi-isothermal compressor, it may be necessary for the water to be atomized. In one embodiment, the water is so finely atomized that it completely vaporizes during the few milliseconds that it stays in the compressor.

Salt-free water will be preferably injected into the compressor so that there are no salt deposits in the expander or the heat exchanger Salt-free water is considerably cheaper than fuel, so there are economic benefits of saving fuel via water injection. There may, however, be some logistical constraints on obtaining salt-free water everywhere. In another embodiment, ordinary tap water could be used. In this embodiment, excess water is injected into the compressor. The compressor outlet would contact a demister to remove any excess water. This excess water will have a higher salt concentration than the initial water because much of the water evaporates in the compressor.

Compressor 106 compresses the ambient air to a high pressure. In one embodiment, the ambient air may be compressed to a pressure of about 10 atm. Other pressures for the compressed air may also be used.

In one embodiment, compressor 106 includes variable-dead-volume device 238, which consists of a small piston 239 in a cylinder. The position of the piston in the cylinder is set by an actuator (not shown), such as an electric servo motor. As depicted in the figure, if piston 239 is positioned to the right, it increases dead volume 237 in chamber 109. When main piston 107 moves upwardly, the extra dead volume prevents the pressure from going high. Conversely, when small piston 239 is positioned to the left, it decreases dead volume 237 in chamber 109. When main piston 107 moves upward, the low dead volume allows the pressure to go high. Regulating the compression ratio in this manner allows the power output of the engine to be adjusted without introducing significant irreversibilities.

In another embodiment, compressor 106 is a gerotor compressor. Such a compressor will be described in greater detail below.

Figure 3A:
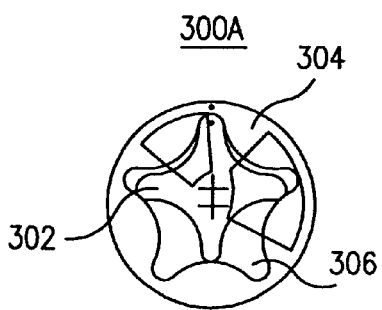
Figure 3B:
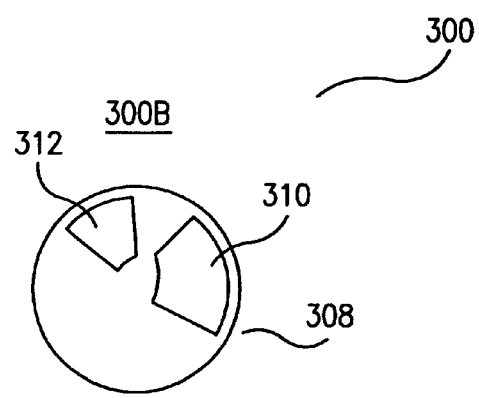

FIGS. 3a and 3b depict the basic elements of gerotor compressor 300. Referring to FIG. 3a, gerotor compressor 300 comprises inner gerotor 302 and outer gerotor 304. Inner gerotor 302 has one less tooth than outer gerotor 304, resulting in a plurality of voids, such as void 306. Outer gerotor 304 also rotates more rapidly than inner gerotor 302.

Referring to FIG. 3b, gerotor compressor includes valve plate 310. Valve plate 310 has at least two openings: at least one gas inlet 312 and at least one gas outlet 310. In FIG. 3b, only two openings are shown; it should be understood that the shape and size of the openings may be changed to optimize the efficiency and operation of the compressor.

As gerotors 302 and 304 rotate, void 306 opens, drawing in gas, such as air, through inlet 310 of valve plate 308. Once void 306 has reached its full volume, valve plate 308 seals void 306, trapping the gas. As gerotors 302 and 304 continue rotating, the volume of void 306 shrinks, compressing the trapped gas. Eventually, the compressed gas is moved to outlet 312 of valve plate 308 and is expelled. This process is continuous, and occurs in a plurality of voids formed between gerotors 302 and 304, as depicted in FIGS. 3c–3l.

Figure 4:
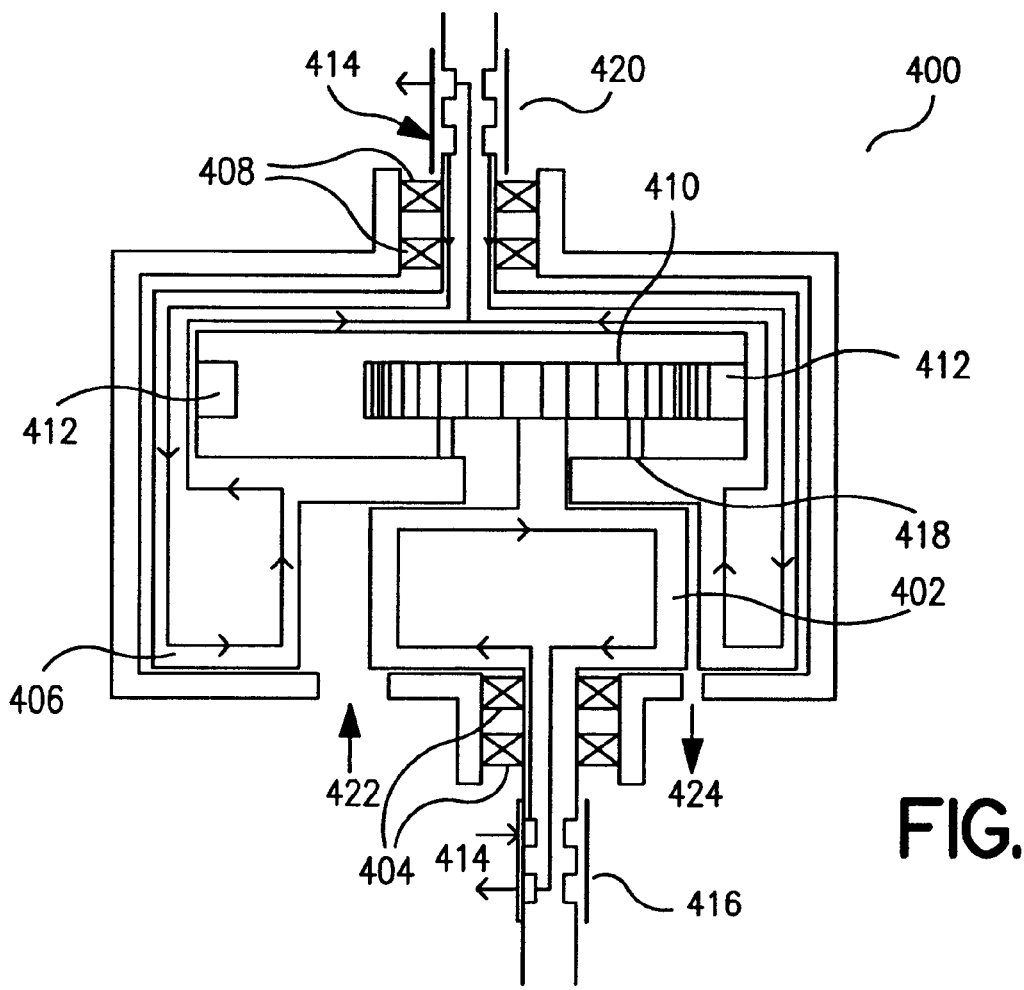
FIG. 4 depicts a schematic cross-section of a gerotor compressor according to one embodiment of the present invention.

FIG. 4 is a schematic cross-section of gerotor compressor 400. Inner gerotor 402 is cantilevered (i.e., has a support projection extending from its base), and is supported by inner gerotor bearings 404. Outer gerotor 406 also is cantilevered, and is supported by outer gerotor bearings 408. The teeth of gerotors 402 and 406 have a tight clearance to prevent blow-by of gases, but they do not contact each other in order to avoid lubrication and wear problems.

Gerotors 402 and 406 are actuated by first gear 410 and second gear 412. First gear 410 and second gear 412 preferably have the same ratio as gerotors 402 and 406. First gear 410 and second gear 412 drive gerotors 402 and 406 such that gerotors 402 and 406 move relative to each other without contact. An advantage of this relative motion is that there is no need to lubricate gerotors 402 and 406. Instead, gears 410 and 412 are lubricated, which is generally considered easier. This lubrication will be discussed in greater detail below.

Gas enters gerotor compressor 400 at gas inlet 422. Compressed gas exits gerotor compressor at outlet 424.

In one embodiment, gerotors 402 and 406 may be constructed of ceramics, and would not require cooling. A drawback to using ceramics is the high material cost. Therefore, in another embodiment, metals may be used. To prevent damage to the metal, the metal may be cooled by coolant 414, which may be circulated. Because all the gerotors rotate, it is necessary to circulate coolant 414 through the gerotors using slip rings 416 and 420.

In another embodiment, a hybrid system is possible, in which the core is made of cooled metal and the exterior is coated with an insulating ceramic that reduces heat losses to coolant 414.

First gear 410 and second gear 412 may be lubricated with a suitable lubricant, such as oil. To prevent gases from entering the lubricant, face seal 418 may be employed. Face seal 418 may include a spring-loaded graphite ring, which rotates against a highly polished surface. The relative rotation between inner gerotor 402 and outer gerotor 406 is small, so face seal 418 should not experience significant wear.

If necessary, the lubricant used to lubricate first gear 410 and second gear 412 may be circulated using slip rings (not shown), which may be similar to those used for coolant 414.

Figure 5:
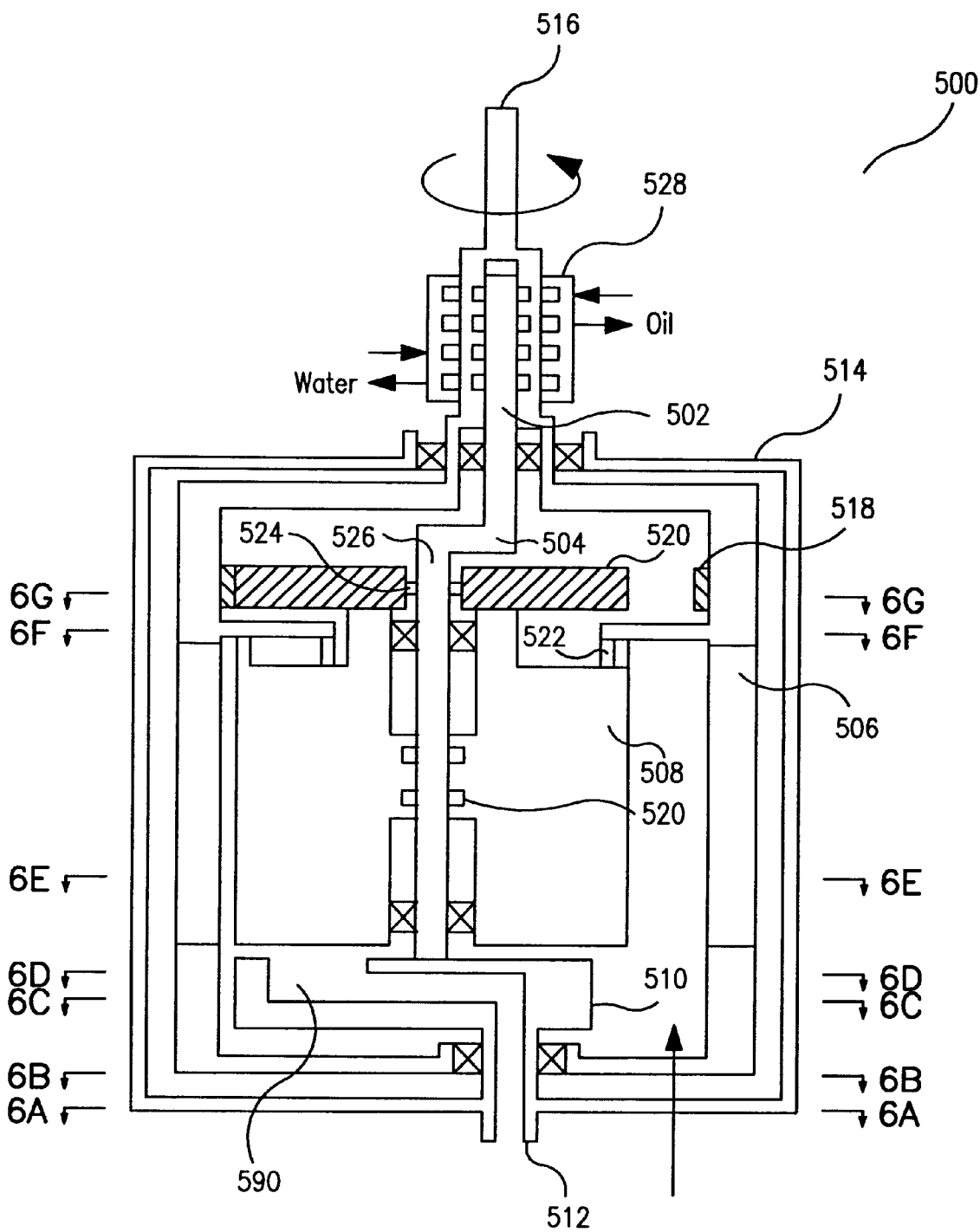
FIG. 5 is a schematic of a non-cantilevered gerotor compressor according to one embodiment of the present invention.

In alternative embodiments, inner gerotor 402 and outer gerotor 406 may be supported without cantilevers. Referring to FIG. 5, a side view of non-cantilevered gerotor compressor 500 is provided. In non-cantilevered gerotor compressor inner gerotor 508 and outer gerotor 506 are supported at their ends, respectively. Therefore, there is no cantilever.

In FIG. 5, stationary, non-rotating shafts 502 and 526 are located in the middle of gerotor compressor 500. "Crook" 504 defines two axes; outer gerotor 506 rotates about one axis and inner gerotor 508 rotates about the other. Stationary shaft 526 is affixed to valve plate 510, which is connected to high pressure pipe 512. High pressure pipe 512 is affixed to housing 514.

Rotating shaft 516 is coupled to outer gerotor 506. Outer gear 518 is affixed to outer gerotor 506 which drives inner gear 520, which is coupled to inner gerotor 508. Inner and outer gears 518 and 520 allow inner and outer gerotors 506 and 508 to rotate without touching, thus eliminating the need for lubricant on the gerotor surfaces. Gears 518 and 520 may be lubricated by oil. Face seal 522 rides on a smooth circular face recessed into the surface of inner gerotor 508. Rotary seal 524 seals against center shaft 526.

Figure 6A:
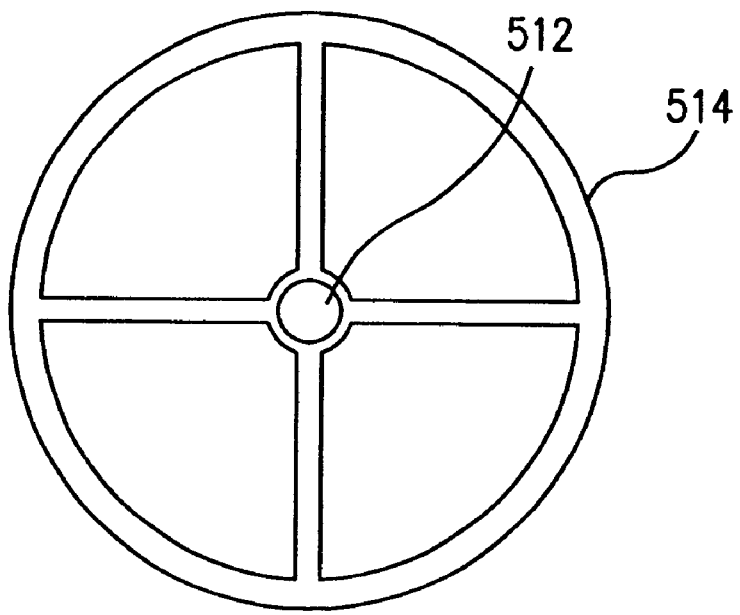
FIGS. 6a–6g represent several sectional views of the non-cantilevered gerotor compressor of FIG. 5.
Figure 6B:
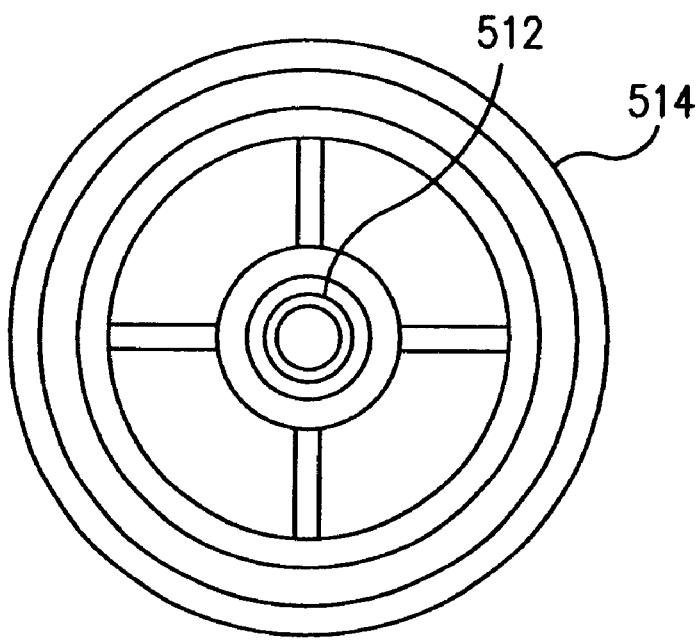
Figure 6C:
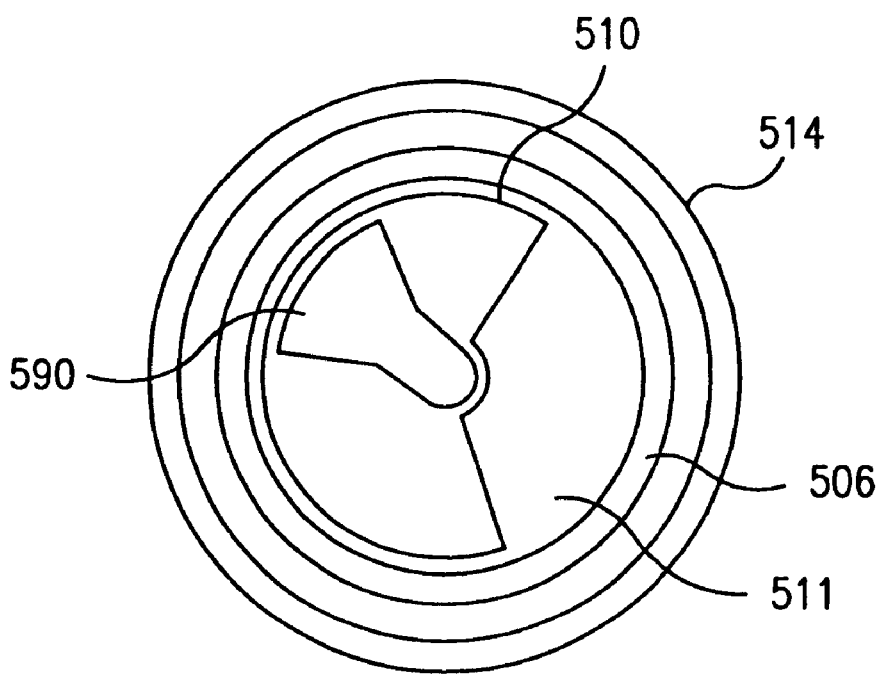
Figure 6D:
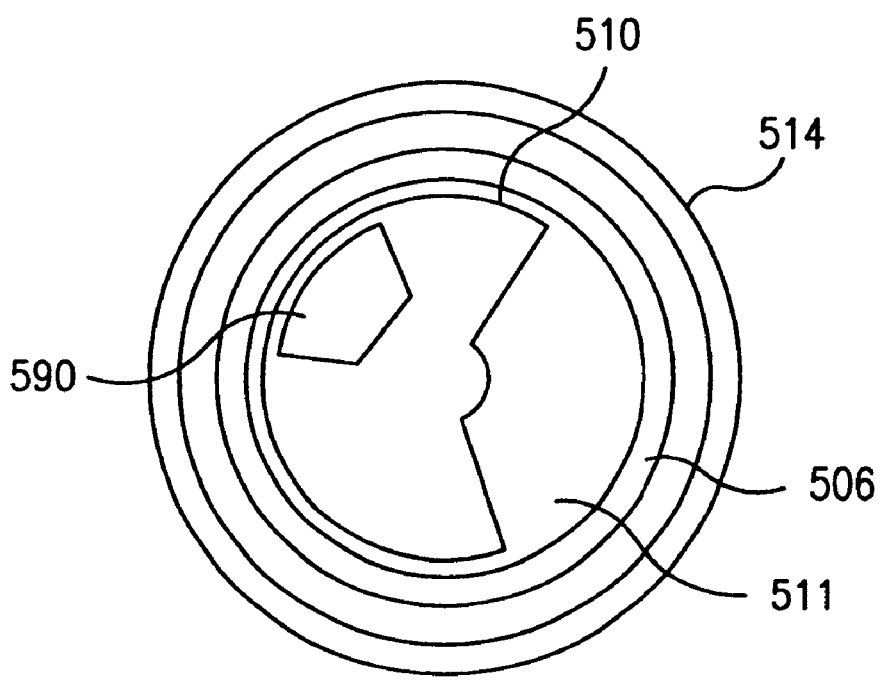
Figure 6E:
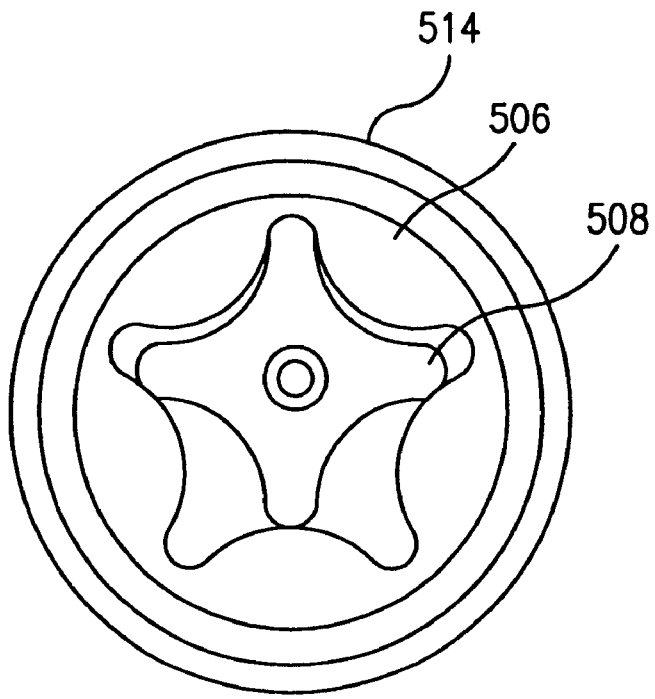
Figure 6F:
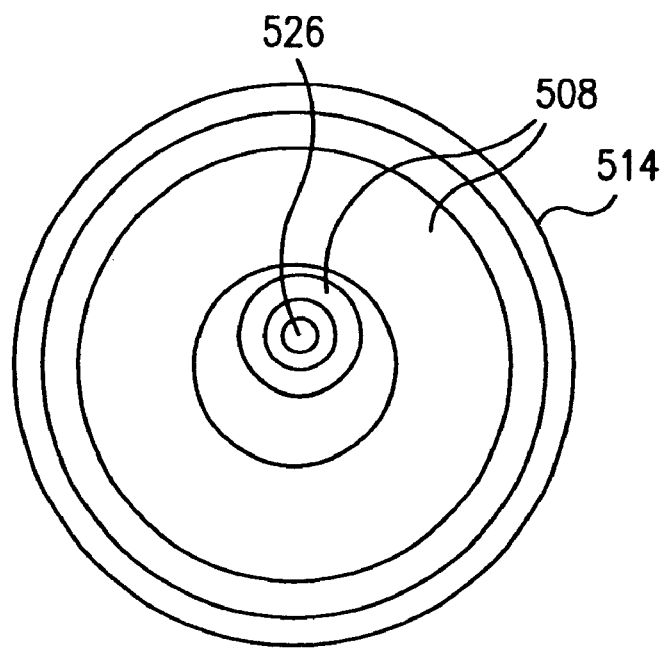
Figure 6G:
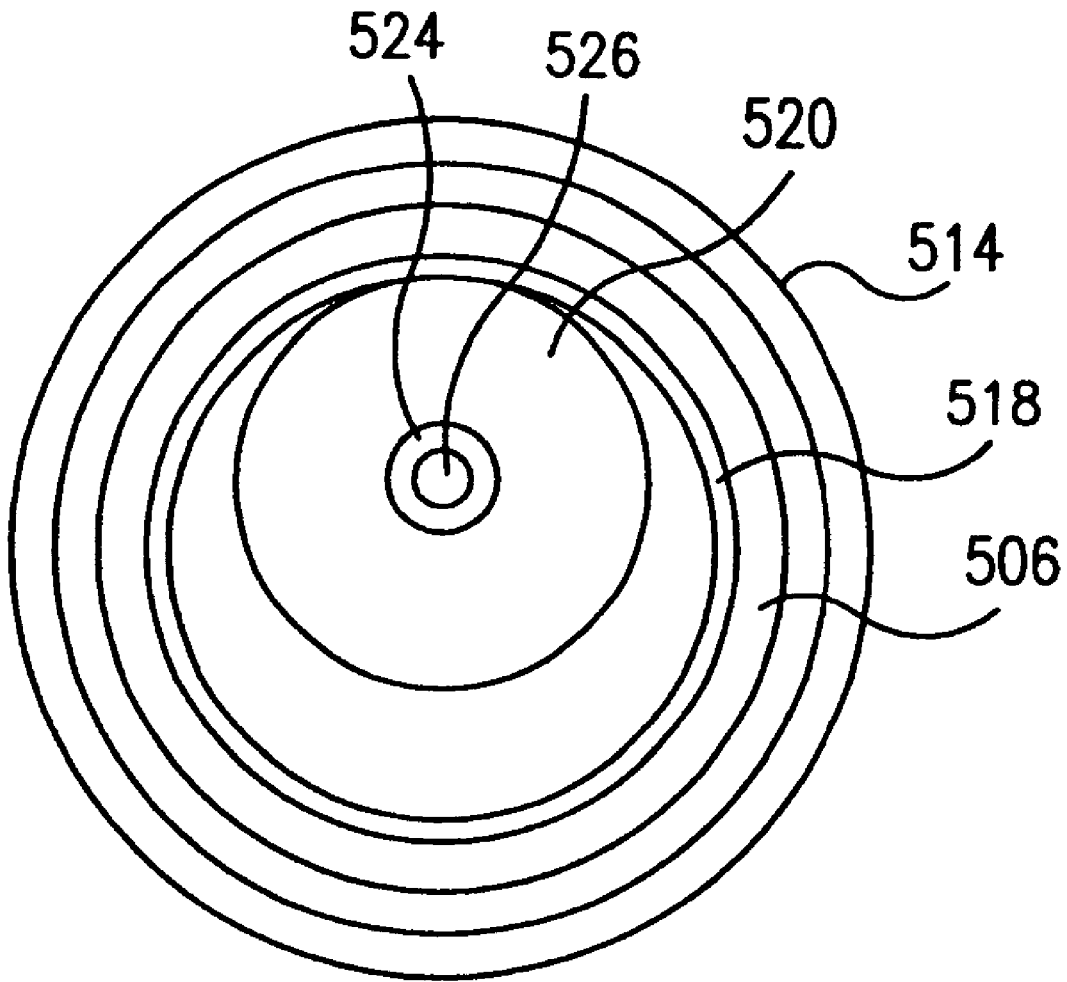

Low pressure gas enters through inlet hole 511 (See FIGS. 6c and 6d) in valve plate 510. The low pressure gas compresses in the gerotors, as described above, and is exhausted as high-pressure gas through exhaust port 590.

Slip ring 528 provides lubricating oil and cooling water, which may be distributed to inner and outer gerotors 506 and 508 through interior channels (not shown) in outer gerotor 506, shafts 502 and 526, and crook 504. Slip rings 530 allow fluids to be distributed to inner gerotor 508.

Several sectional views of non-cantilevered gerotor compressor 500 are shown in FIGS. 6a–6g.

Figure 7:
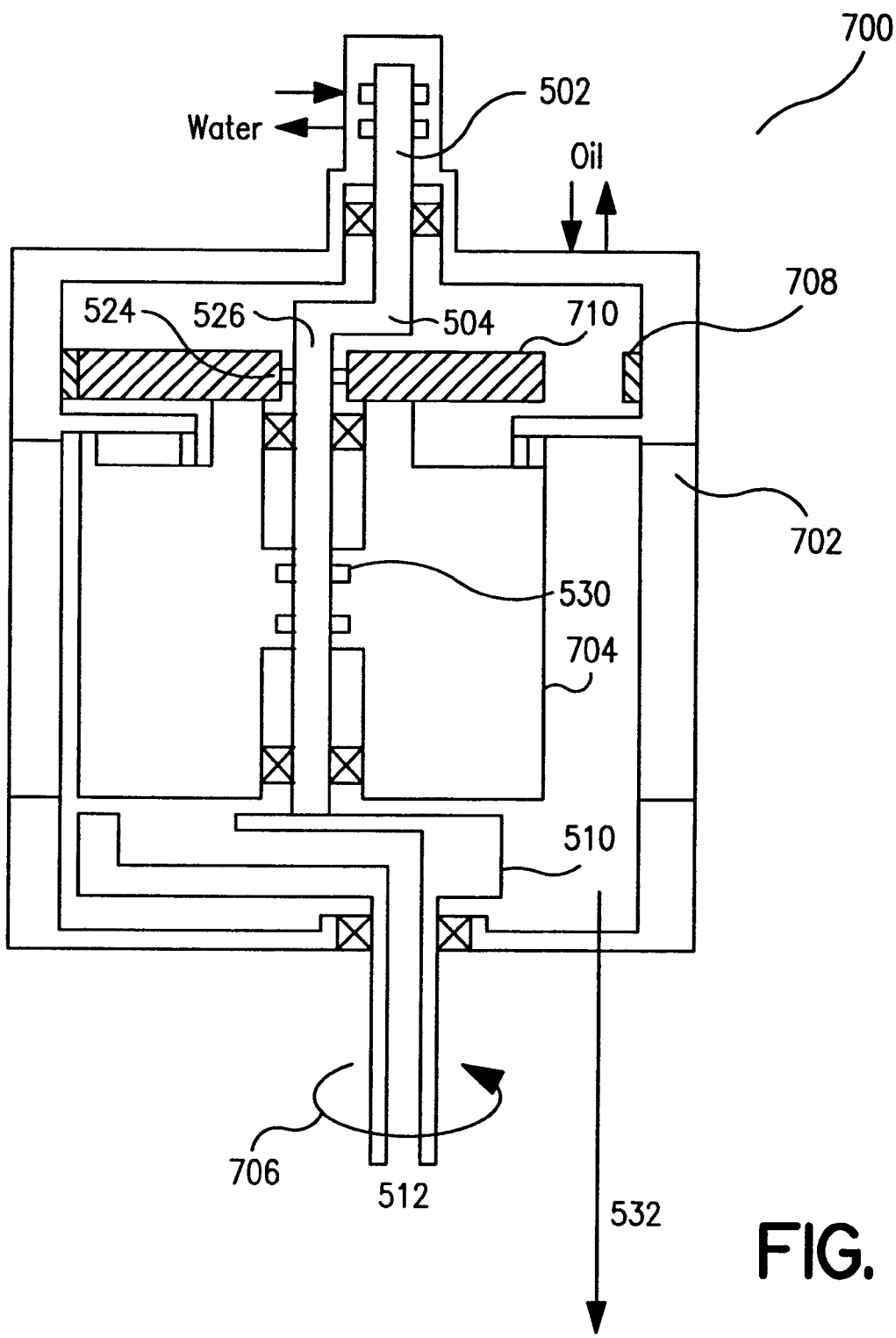
FIG. 7 is a schematic of a non-cantilevered gerotor compressor according to another embodiment of the present invention.

In an alternate embodiment, shown in FIG. 7, the housing has been eliminated. In this embodiment, outer gerotor 702 is stationary, and inner gerotor 704 rotates as driven by rotating vane plate 706. As inner gerotor 704 rotates, gears 708 and 710 cause it to spin in orbital motion.

One of ordinary skill in the art will recognized that, although the embodiments of the gerotor compressor and non-cantilevered gerotor compressor are described above as compressors, they function equally as well as expanders. When used as expanders, their operation reversed. For example, in an expander, the gerotors rotate in the opposite direction, and gas enters the expander at a high pressure, performs work (i.e., expands), and is exhausted as low pressure gas.

Referring again to FIG. 2, compressor 106 may be driven by a drive means, such as belt 204, through compressor clutch 202 in a manner that is known in the art.

The compressed air from compressor 106 flows through heat exchanger, or regenerator, 108, where it is pre-heated. In one embodiment, the compressed air is heated to a nominal temperature of about 1039 K.

To save weight and reduce costs, heat exchanger 108 may be sized to handle the heat duty associated with constant-speed highway travel (normally about 15 hp output power for an automobile). Compressor 106 and expander 114 have the capacity to operate at much higher power outputs (e.g., about 150 hp) for acceleration purposes. The engine, as a whole, is less efficient during these power bursts, but because the power bursts are usually only a small portion of the operating cycle, their effect on the overall efficiency of the system should be minimal.

Figure 8:
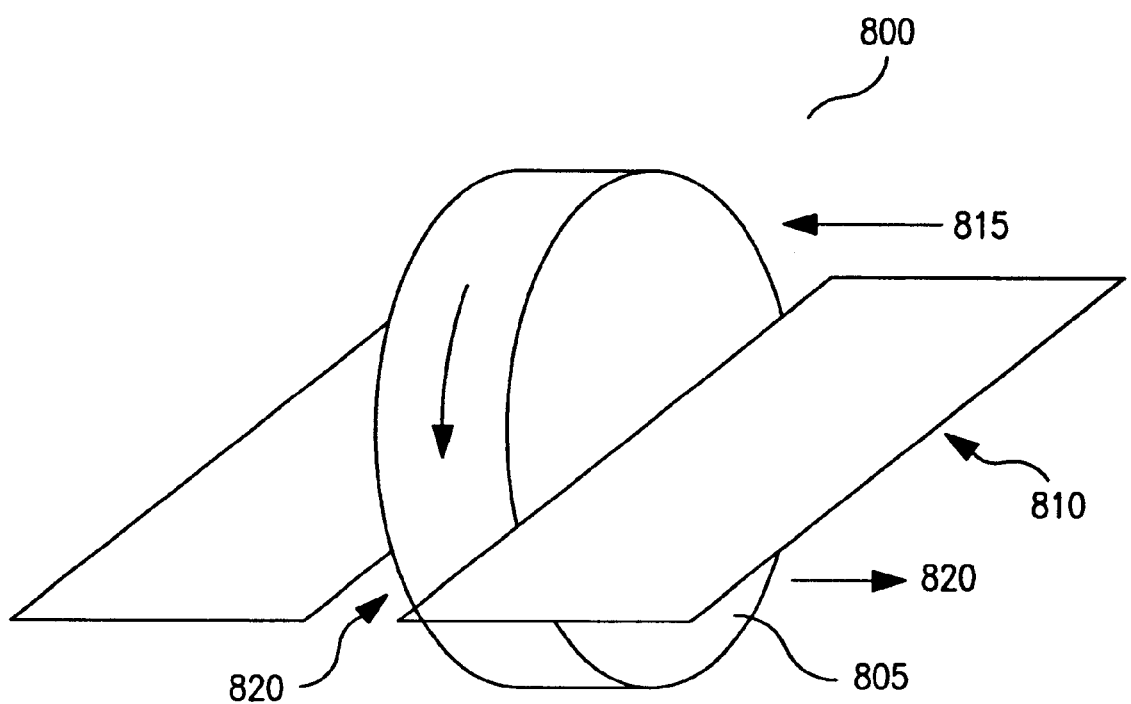
FIG. 8 depicts a schematic of a spinning-wheel regenerator according to one embodiment of the present invention.

In one embodiment, heat exchanger 108 may be a countercurrent heat exchanger. In another embodiment, heat exchanger 108 may be a spinning-wheel regenerator, an example of which is shown in FIG. 8. Spinning wheel 800 may have a porous mesh of metal or ceramic, or similar material 805 through which gasses flow. Stationary divider 810 allows hot gas 815 to be separated from cold gas 820. As hot gas 815 flows through porous mesh 805, it heats mesh 805. As spinning wheel 800 rotates, mesh 805, which is heated, contacts cold gas 820, causing cold gas 820 to become hot. As spinning wheel 800 continues to spin, mesh 805, now cooled, again comes in contact with hot gas 815 where it is again heated.

The preheated, compressed air leaves heat exchanger 108 and, when inlet valve 232 is open, flows to combustor 112, where fuel 110 is added and the air/fuel mixture is ignited by igniter 218.

Figure 9:
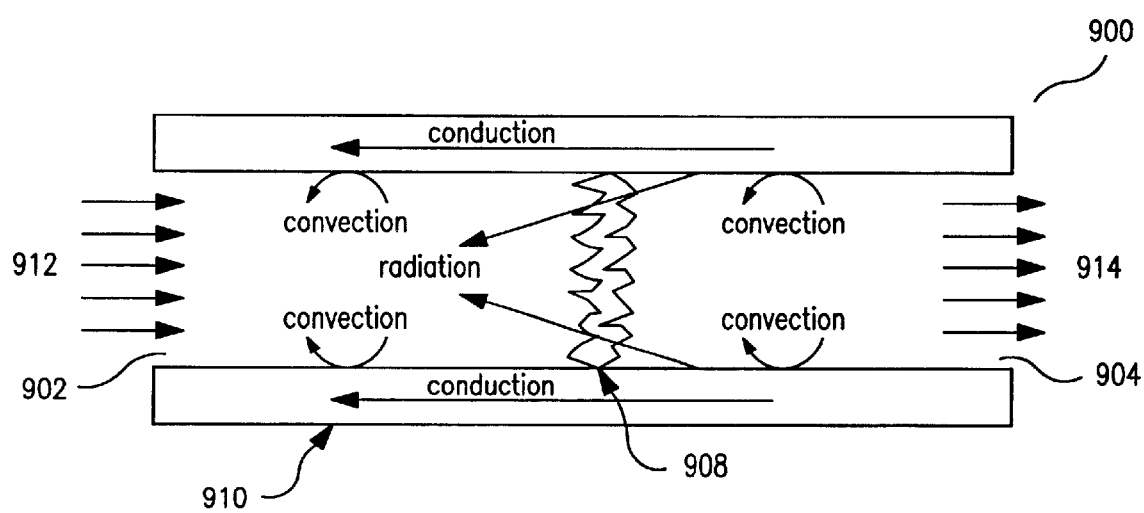
FIG. 9 depicts a schematic cross-section of a ceramic tubular combustor according to one embodiment of the present invention.

In one embodiment, combustor 112 may be a tubular combustor. The general concept of the tubular combustor, which is known to those of ordinary skill in the art, was developed by Professor Stuart Churchill of the University of Pennsylvania. Referring to FIG. 9, a schematic cross-section of tubular combustor 900 according to one embodiment of the present invention is provided. Tubular combustor 900 includes combustor wall 910. In one embodiment, combustor wall may be ceramic, which allows the temperature in the tubular combustor 900 to reach about 2200 K, which ensures complete combustion of the air/fuel mixture. Other suitable materials, such as high-temperature metal, may also be used.

In operation, air/fuel mixture 912 enters combustor 900 at inlet 902 and is heated by combustor wall 910 by radiation and convection. Once the gas reaches the ignition temperature, flame front 908 is initiated. During start up, flame front 908 may be initiated by an igniter, such as a spark plug (not shown). When tubular combustor 900 is made of ceramic, flame front 908 is so hot that all the fuel is completely ignited; there are no unburned hydrocarbons exiting ceramic tubular combustor 900. The combusted air/fuel mixture exits combustor 900 as exhaust gasses 914 from outlet 904.

Figure 10:
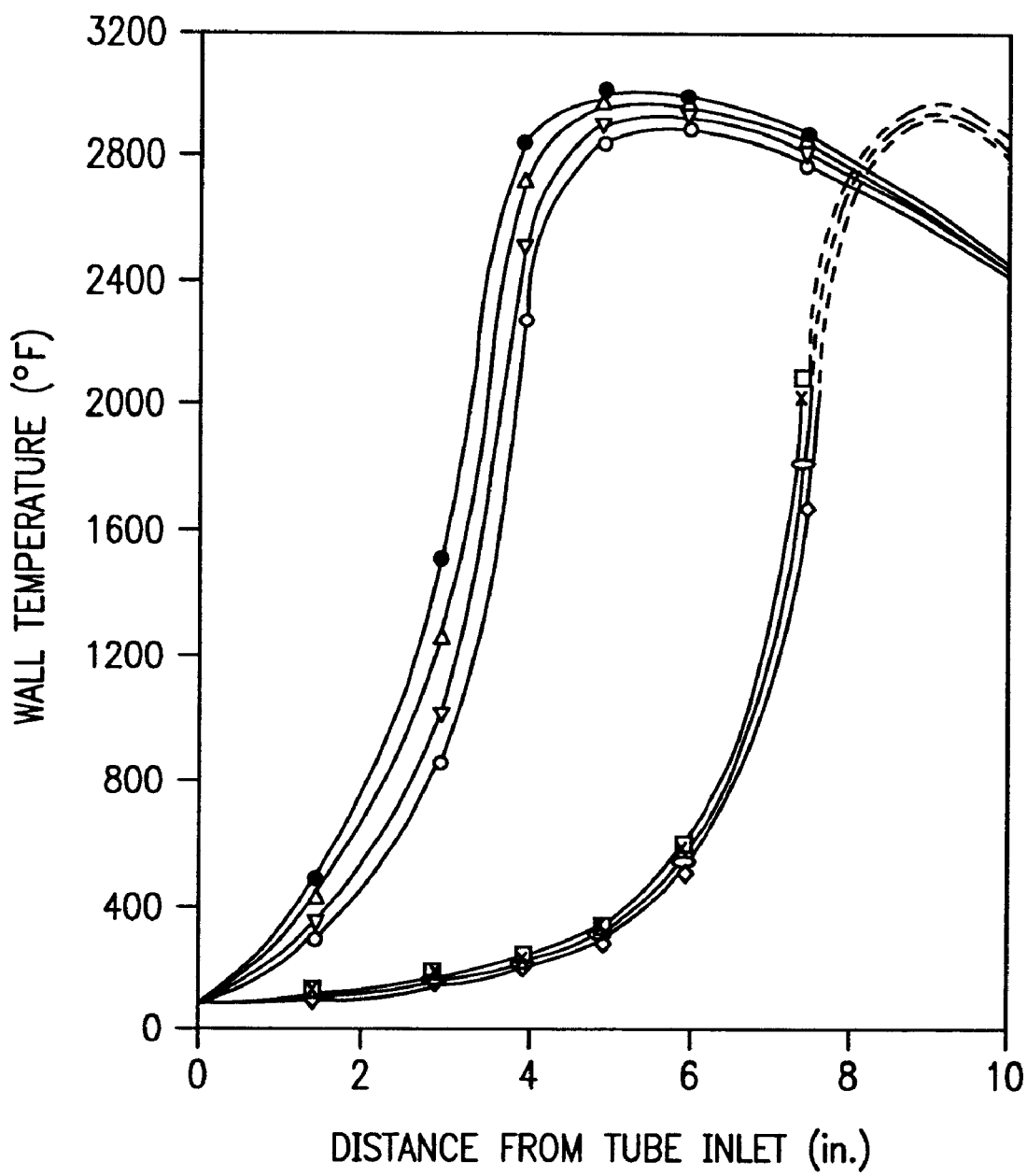
FIG. 10 is a graph of measured temperature profiles along the axis of tubular combustor according to one embodiment of the present invention.

FIG. 10 shows measured temperature profiles along the axis of tubular combustor 900. There are seven possible steady-state temperature profiles. Through Stuart Churchill's research, all seven were predicted by computer simulations and later, all seven were determined experimentally.

The high temperatures in the tubular combustor causes carbon monoxide to be formed initially. Because there is an abundance of excess air, however, as the gases cool, carbon dioxide is formed. Therefore, it is possible to operate the engine of the present invention with a carbon monoxide concentration of about 0.5 ppm.

Tubular combustors have several advantages over conventional burners. For instance, conventional burners use intentional backmixing to preheat the air/fuel mixture to its ignition temperature. Unfortunately, backmixing promotes $NO_x$ formation because it increases the residence time of the gas. In contrast, a tubular combustor has no backmixing; the gas flows through the tubular combustor in a plug-flow manner. The residence time is so short (about 7 ms), that it is possible to operate the tubular combustor with very low $NO_x$ formation.

Figure 11:
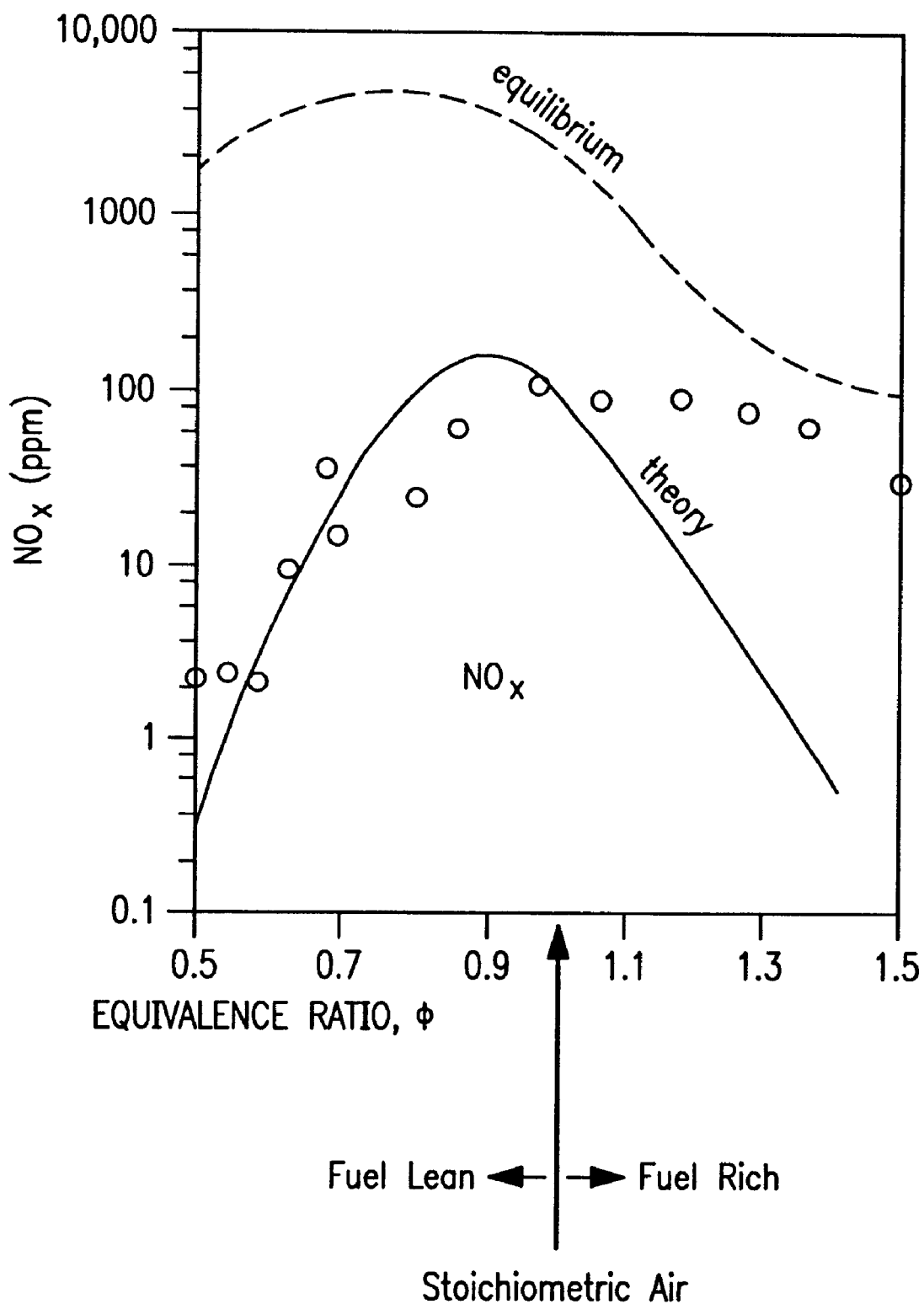
FIG. 11 is a graph of $NO_x$ concentration vs. equivalence ratio.

FIG. 11 shows that at equivalence ratios below 0.6, the $NO_x$ concentration is only about 2 ppm. The equivalence ratio, $\Phi$, is defined as the actual fuel added compared to the required stoichiometric fuel addition. Using room-temperature air as the feed, at an equivalence ratio of 0.6, the temperature exiting the tubular combustor is approximately 1300 K.

At higher equivalence ratios, the combustion temperature rises, which increases the engine efficiency. This, however, also increases NO$_x$ production. Thus, in another embodiment, a catalytic converter is used to reduce the amount of NO$_x$. Possible reductants include, inter alia, ammonia, urea, and fuel. Typical consumption of liquid ammonia may be about 2 mL/h during highway driving.

The tubular combustor was designed primarily for stationary power production under the assumption that it would not experience many start/stop cycles. Prior to startup, the ceramic is cold; it must be heated prior to use. Therefore, in one embodiment, the ceramic may be wrapped with a resistance heater (not shown) to preheat the ceramic before fuel is introduced. Other suitable preheating devices and techniques may also be used.

In another embodiment, the tubular combustor may be placed inside a cylinder, such that there is an annular space between the tubular combustor and the cylinder. The annular space may be filled with an absorbent material. In one embodiment, the absorbent material may absorb hydrogen, and, in the process, give off heat. This serves to preheat the tubular combustor.

In another embodiment, the annular space a vacuum, and may be filled with very thin (about ⅟1000 of an inch) plates of nickel in multiple layers. In one embodiment, 100 layers are used. The highly-polished multiple layers of nickel is a poor conductor, and will maintain heat from operation for a significant time. Therefore, if the engine is run frequently (e.g., daily), the tubular combustor should maintain some heat from that operation.

Referring again to FIG. 2, igniter 218 may be a conventional spark plug. In another embodiment, igniter 218 is a "rail gun" spark plug. This rail gun spark plug sends a "lightning bolt" down the center of combustor 112 to ignite the air/fuel mixture during startup.

The amount, timing, and duration of firing that igniter 218 provides may vary. In one embodiment, igniter 218 need only be fired one time to initiate the flame front. Once the air/fuel mixture is initially ignited, the added air/fuel mixture sustains the flame front, eliminating the need for additional firings from igniter 218. In another embodiment, in order to increase the turn-down ratio of the combustor, which is defined as the maximum combustion rate divided by the minimum combustion rate, igniter 218 continues to fire after the initial startup. In the case of the piston expander, the timing may coincide with the periodic expansions of the pistons. In the case of the gerotor expander, the firing may be continuous.

After combustion, the high-pressure, hot gas flows through expander 114 which produces shaft power. Expander 114 may comprise sleeve 220 and cap 222, which will be discussed in greater detail below.

At the beginning of expansion, the pressure is constant (e.g., about 10 atm) because inlet valve 232 is open. When inlet valve 232 closes, the expansion continues adiabatically, thus cooling the gas as work is produced. In one embodiment, ceramic sleeve 220 and ceramic cap 222 may be used to insulate the gasses from wall 236, which is cooled. Ceramic cap 222 has no sliding contact with wall 236 so lubrication need not be provided. It is also not necessary to account for the thermal expansion of cap 222 and wall 236. Ceramic sleeve 220 need not be bonded to wall 236, allowing small gap to be placed between sleeve 220 and wall 236, thus allowing for different thermal expansion of the ceramic and wall material. Because gasses freely flow between ceramic sleeve 220 and wall 236, the ceramic sleeve does not need to withstand a pressure difference across its wall.

In another embodiment, expander 114 may include variable-dead-volume device 240. Variable-dead-volume device 240 functions similar to variable-dead-volume device 238, described in conjunction with compressor 106, above.

In another embodiment, expander 114 may be a gerotor expander. The gerotor expander works exactly like the gerotor compressor, describe above, except that it operates in reverse. For instance, the high-pressure gas enters through small port 312 in FIG. 3b and exits through large port 310. As the expander heats, dimensions of its components will grow. This can be minimized by cooling the components. To minimize heat losses to coolant, the gerotors could be coated with an insulating ceramic.

In another embodiment of expander 114, shown in FIG. 2, ceramic sleeve 220 and ceramic cap 222 may be eliminated in favor of a traditional metal piston and cylinder, but there will be greater heat loss to the walls. In another embodiment, a ceramic piston and cylinder may be used in place of metal.

Other suitable expander designs, such as a Wankel expander, may also be used.

As shown in FIG. 2, expander 114 drives expander clutch 208, which drives transmission 216 and drive shaft 206, eventually connects to a driving means, such as wheels, for moving a vehicle. In addition, power to operate compressor 106 is provided through belt 204, or other suitable drive mechanism.

When expansion is complete, exhaust valve 234 is opened, allowing the gasses to exit expander 114. The gases exiting expander 114 are hot, and flow through heat exchanger 108, where they preheat incoming gas, and are finally discharged to the atmosphere as exhaust gasses 116.

The engine torque can be regulated in several ways, including throttling and variable compression ratio. The throttling approach is similar to the manner in which Otto cycle engines are controlled. The engine has a fixed compression ratio, but because the air inlet is choked, the compressor inlet is at a vacuum. Because the compressor starts from a vacuum, the maximum pressure achieved by the compressor is less, which reduces the torque output of the engine. Because of the irreversibilities associated with the throttle, this approach does not favor energy efficiency; however, it is very simple to implement.

In one embodiment, the amount of fuel added per stroke may be varied. More fuel raises the temperature, which increases the pressure, which increases the work per stroke. The disadvantage to this approach is that operating under low torque means the engine temperature is lower, which reduces efficiency.

The variable-compression-ratio approach changes the compression ratio of both the compressor and expander. In the case of the gerotor compressor/expander, variable compressor may be achieved by varying the shape of the openings on the valve plates. A low compression ratio is achieved by enlarging discharge port of the gerotor compressor and the inlet port of the gerotor expander. Conversely, a high compression ratio may be achieved by shrinking discharge port of the gerotor compressor and inlet port of the gerotor expander. Mechanisms for accomplishing this are described in U.S. patent appl'n. Ser. No. 09/126,325 by Holtzapple et al., entitled "Vapor-Compression Evaporative Air Conditioning System and Components," filed Jul. 31, 1998, the disclosure of which is incorporated by reference in its entirety.

At lower compression ratios, the engine produces less torque and at higher compression ratios, the engine produces more torque. Unlike conventional Brayton cycles, the energy efficiency of the quasi-isothermal Brayton cycle engine does not depend on the compression ratio, so this is a very efficient way to vary the torque output of the engine.

In the case of the piston compressor/expander, a variable compression ratio may be achieved using variable-dead-volume devices 238 and 240 in both compressor 106 and expander 114. Increasing the dead volume of compressor 106 decreases the output pressure, which reduces engine torque. Conversely, decreasing the dead volume of compressor 106 increases the output pressure, which raises engine torque. When the pressure of compressor 106 is low, expander 114 needs a lower expansion ratio, so more dead volume is employed. When the pressure of compressor 106 is high, expander 114 needs a higher expansion ratio, so less dead volume is used.

The system of the present invention may employ regenerative braking. Referring to FIG. 2, one embodiment uses valves 210, 211, and 212, pressure tank 214, and clutches 208 and 202, which may be any suitable clutch known in the art. Pressure tank 214 may have many potential shapes, such as spherical and cylindrical shapes. It may be composed of metal or composite materials, such as graphite fiber embedded in polymer. It may have any suitable size.

During steady-state operation, valve 212 is closed and valves 210 and 211 are open, allowing compressed air to go directly from compressor 106 to combustor 112. During braking, expander clutch 208 is disengaged, but compressor clutch 202 remains engaged. Valve 211 is closed while valves 210 and 212 remain open, allowing air discharged from compressor 106 to be stored in pressure tank 214. During normal braking, the kinetic energy of the vehicle is stored as compressed air in pressure tank 214 which may be recovered for later use. In the case of rapid stops, friction brakes (not shown), which are known in the art, may be applied, dissipating the vehicle's kinetic energy as heat.

When the vehicle starts up from a stop, compressor clutch 202 is disengaged, and expander clutch 208 is engaged. Valve 210 is closed, while valves 211 and 212 remain open. High-pressure air stored in pressure tank 214 flows through countercurrent heat exchanger 108 where it is preheated, enters combustor 112, flows through expander 114, and exits through countercurrent heat exchanger 108. During startup, the energy stored as compressed gas is released, allowing the vehicle to accelerate. Because the compressor load is removed during startup, all the shaft power from expander 114 can be delivered to the driveshaft. This may give a significant (e.g., about 30%) power boost.

High-pressure air is stored in pressure tank 214, so it may not be necessary to use external power to start the engine. During start-up, both compressor clutch 202 and expander clutch 208 are disengaged. Valves 211 and 212 are open, and valve 210 is closed. Once combustor 112 is hot, and expander 114 is at speed, the valves and clutches would be set for steady-state operation.

In another embodiment, pressure tank 214 is not provided, and an external power source is used to start the engine.

The engine of the present invention has many potential applications. For example, the engine of the present invention may be used in locomotives. Because of the large energy consumption of locomotives, all energy-efficient features (regenerative braking, countercurrent heat exchanger, water injection, variable-compression-ratio control) are justified. The compressed air tank may be a high-pressure tank car located closely behind the locomotive. Economic studies show that a train that makes more than five stops per day can justify the expense of such an air tank.

In the marine industry, boats and ships do not need regenerative braking. Other energy-efficient features (countercurrent heat exchanger, water injection, variable-compression-ratio control), however, can be justified.

The engine may be used with tractor/trailers. Because of the large energy consumption of tractor/trailers, all energy-efficient features (regenerative braking, countercurrent heat exchange, water injection, variable-compression-ratio control) can be justified. The compressed air tank could be located underneath the trailer.

The engine could be used with busses. Because of the large energy consumption of buses, all energy-efficient features (regenerative braking, countercurrent heat exchanger, water injection, variable-compression-ratio control) can be justified. The compressed air tank can be located underneath the bus. Because of their frequent stops, friction-brake maintenance is one of the largest expenses for city buses; the regenerative braking system would drastically reduce this expense.

In automobiles, space is at a premium and safety is a great concern. Some automobile designers might be reluctant to put high-pressure air tanks in the vehicle, so regenerative braking might not be incorporated into automobiles. However, other energy efficiency features (countercurrent heat exchanger, water injection) could be used without much penalty. For simplicity, engine control may be achieved using throttling rather than variable compression ratio.

The quasi-isothermal Brayton cycle engine may also be used for stationary power applications, such as electricity generation, or operating industrial machinery, such as pumps, compressors, blowers, etc. In this case, all energy-efficient features other than regenerative braking, such as countercurrent heat exchanger, water injection, variable-compression-ratio control, may be used.

EXAMPLE

In order to facilitate a more complete understanding of the invention, an Example is provided below. However, the scope of the invention is not limited to specific embodiments disclosed in this Example, which is for purposes of illustration only.

Energy Efficiency Table 1, below, summarizes the results of an efficiency analysis of an embodiment of the engine of the present invention. Three countercurrent heat exchangers were considered: stainless steel, high alloy and ceramic. Two approach temperatures were considered (50 and 100 K), both of which are easily achieved. Also, two compressor/expander efficiencies were considered: 0.7 and 0.8. (Note: compressor efficiency is calculated as the theoretical reversible power required assuming perfect water vaporization divided by the actual power required. Expander efficiency is calculated as the actual power production divided by the theoretical reversible power produced by an adiabatic expander). Depending upon the assumptions, the engine efficiencies range from 0.44 to 0.64.

TABLE 1

Engine efficiency as a function of combustor temperature, heat exchanger approach temperature, and compressor/expander efficiency.

| Heat Exchanger | Discharge Temp from Tubular Combustor (K) | Approach (K) | Compressor or Expander Efficiency | Cycle Efficiency | Approximate $NO_x$ (ppm) |
|---|---|---|---|---|---|
| Stainless Steel (900 K*) | 1,502 | 100 | 0.7 | 0.440 | 25 |
|  |  |  | 0.8 | 0.549 |  |
|  |  | 50 | 0.7 | 0.470 |  |
|  |  |  | 0.8 | 0.584 |  |
| High Alloy (1050 K*) | 1,752 | 100 | 0.7 | 0.481 | 50 |
|  |  |  | 0.8 | 0.604 |  |
|  |  | 50 | 0.7 | 0.509 |  |
|  |  |  | 0.8 | 0.587 |  |
| Ceramic (1200 K*) | 2,002 | 100 | 0.7 | 0.506 | >100 |
|  |  |  | 0.8 | 0.619 |  |
|  |  | 50 | 0.7 | 0.532 |  |
|  |  |  | 0.8 | 0.635 |  |

*Peak temperature in heat exchanger

Dimensions

Figure 12A:
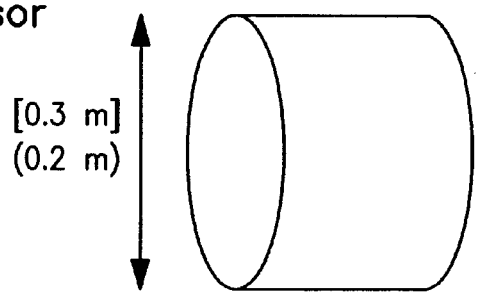
FIGS. 12a and 12b shows the approximate dimensions of the compressor and expander for a 100-kW engine according to one embodiment of the resent invention.
Figure 12B:
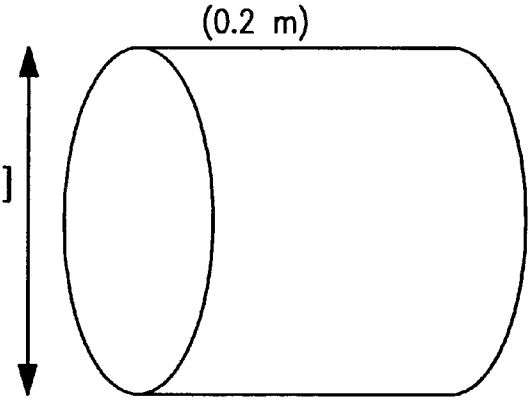

FIGS. 12a and 12b show the approximate dimensions of the gerotor compressor and expander, respectively, for a 100-kW engine at two rotational speeds: 3000 rpm and 10,000 rpm, according to embodiments of the present invention. It should be noted that, at both speeds, the dimensions are very compact.

Figure 13:
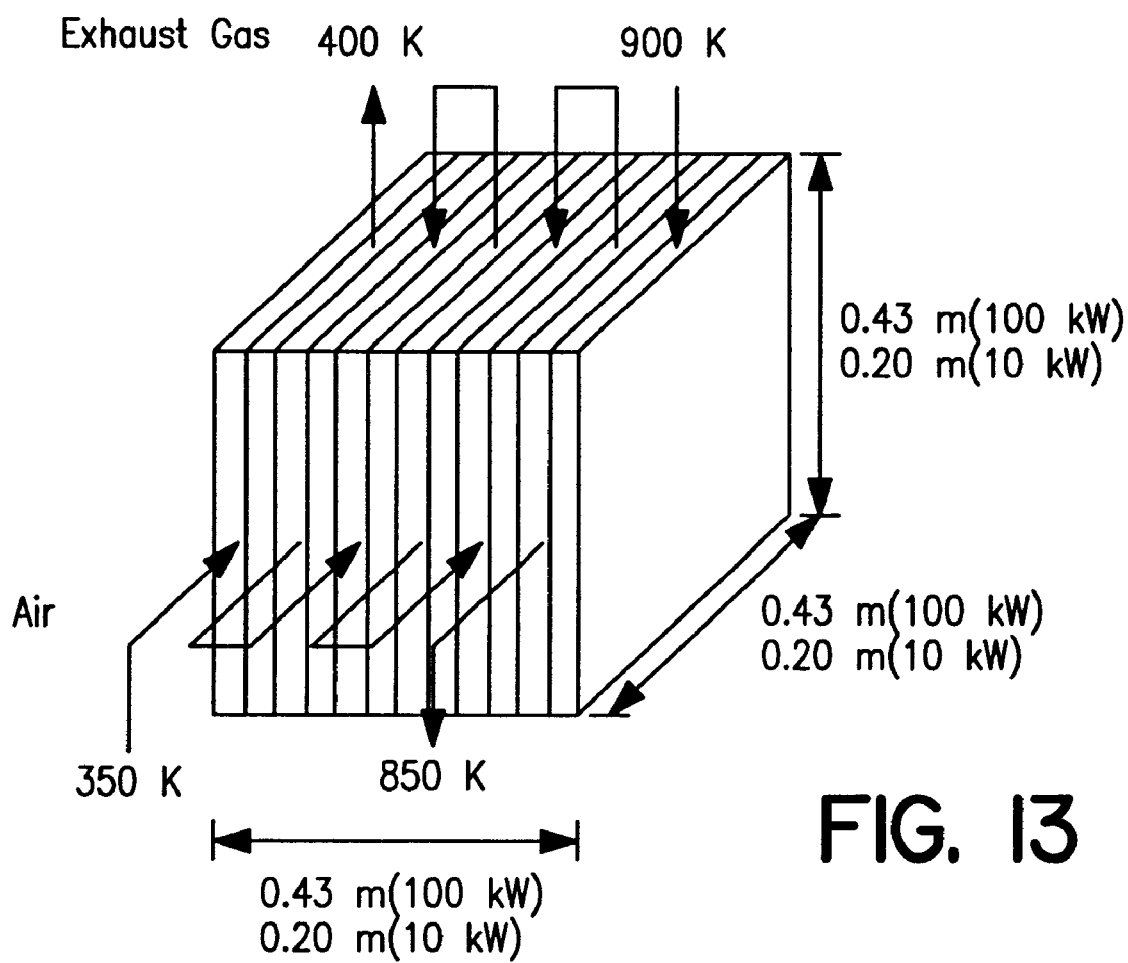
FIG. 13 shows the approximate dimensions a heat exchanger according to one embodiment of the present invention.

FIG. 13 shows the approximate dimensions of the countercurrent heat exchanger according to one embodiment of the present invention. In one case, the heat exchanger is sized to transfer the heat for the engine operating a full load (100 kW). Here, it is assumed the engine will be controlled using the variable-compression-ratio approach. With this control strategy, at a given rotational rate, the air flow through the engine is the same regardless of the torque output; so, the heat exchanger must be sized for the maximum power output. In another case, the engine would be throttled to reduce engine power. This reduces the mass flow through the engine which reduces the amount of countercurrent heat transfer. FIG. 13 shows the dimensions corresponding to the throttled mass flow required to produce 10 kW of power.

Figure 14:
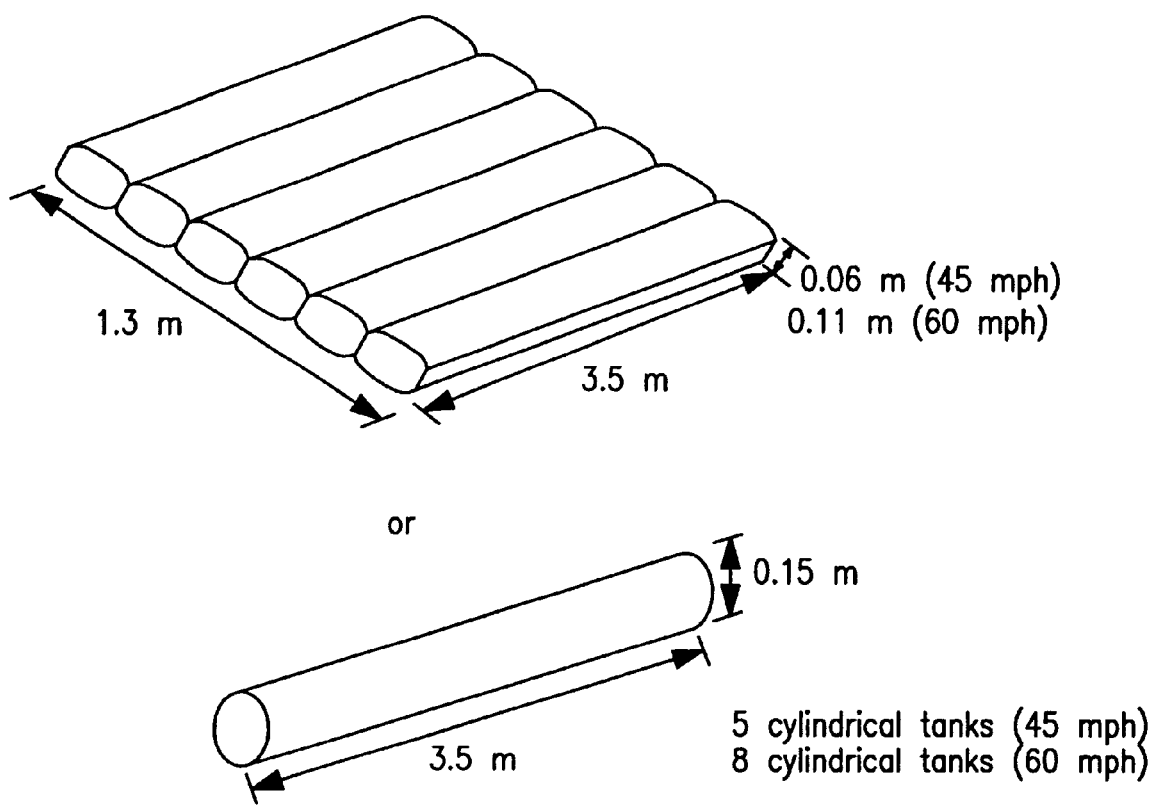
FIG. 14 shows the approximate dimensions of the compressed air tanks used for regenerative braking according to one embodiment of the present invention.

FIG. 14 shows the approximate dimensions of the compressed air tanks used for regenerative braking according to one embodiment of the present invention. These dimensions are for a vehicle mass of 3000 lb. (1364 kg). Two regenerative braking options are shown: 45 to 0 mph and 60 to 0 mph. Because high-speed braking is less common, the lower speed should be sufficient. In one concept, the air tanks are joined like a raft which would be located under the car. Potentially, these tanks could be an integral part of the automobile structure. Alternatively, the compressed air could be stored in cylinders or spheres.

The quasi-isothermal compressor requires only 1.4% more power than a true isothermal compressor, so it closely approximates an isothermal compressor. It requires 22% less energy than an adiabatic compressor, so its energy savings are substantial. Because of the lower energy requirements of the compressor, the quasi-isothermal Brayton cycle engine uses 22% less fuel than a traditional Brayton cycle with regenerator. To achieve this energy efficiency requires about two liters of water per liter of fuel, but because the engine is about three times more efficient than Otto cycle engines, the total amount of fluids that must be carried on the vehicle is about the same as conventional vehicles currently carry.

The quasi-isothermal Brayton cycle engine offers an alternative to the other engine approaches. It promises pollution and efficiency characteristics typical of fuel cells, but because of its simplicity, the capital cost should be comparable to conventional Otto and Diesel engines.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A non-cantilevered gerotor compressor comprising:

an inner gerotor;

an outer gerotor;

a first bearing arrangement adapted to support said inner gerotor, wherein said first bearing arrangement only is positioned on a first side of a seal plate;

a second bearing arrangement adapted to support said outer gerotor, wherein at least one portion of said second bearing arrangement is positioned on a second side of said seal plate;

a valve plate positioned adjacent to an end of said outer gerotor; and a stationary center shaft connected to said valve plate, wherein said inner gerotor and said outer gerotor are independently driven from one another.

2. The gerotor of claim 1, wherein said inner gerotor and said outer gerotor do not touch.

3. A non-cantilevered gerotor expander comprising:

an inner gerotor;

an outer gerotor;

a first bearing arrangement adapted to support said inner gerotor, wherein said first bearing arrangement only is positioned on a first side of a seal plate;

a second bearing arrangement adapted to support said outer gerotor, wherein at least one portion of said second bearing arrangement is positioned on a second side of said seal plate;

a valve plate positioned adjacent to an end of said outer gerotor; and a stationary center shaft connected to said valve plate, wherein said inner gerotor and said outer gerotor are independently driven from one another.

4. The gerotor of claim 3, wherein said inner gerotor and said outer gerotor do not touch.

5. A gerotor compressor comprising:

an inner gerotor;

an outer gerotor;

a first bearing arrangement adapted to support said inner gerotor, wherein said first bearing arrangement only is positioned on a first side of a seal plate; and a second bearing arrangement adapted to support said outer gerotor, wherein at least one portion of said second bearing arrangement is positioned on a second side of said seal plate, and wherein said inner gerotor and said outer gerotor are independently driven from one another and said gerotor compressor is an axial-flow gerotor compressor.

6. The gerotor of claim 5, wherein said inner gerotor and said outer gerotor do not touch.

7. A gerotor expander comprising:

an inner gerotor;

an outer gerotor;

a first bearing arrangement adapted to support said inner gerotor, wherein said first bearing arrangement only is positioned on a first side of a seal plate; and a second bearing arrangement adapted to support said outer gerotor, wherein at least one portion of said second bearing arrangement is positioned on a second side of said seal plate, and wherein said inner gerotor and said outer gerotor are independently driven from one another and said gerotor expander is an axial-flow gerotor expander.

8. The gerotor of claim 7, wherein said inner gerotor and said outer gerotor do not touch.

* * * * *